Oct. 3, 1967  M. M. BRYAN, JR  3,344,480
AUTOMATIC FIBER PROCESSING APPARATUS
Filed Sept. 13, 1965  3 Sheets-Sheet 3

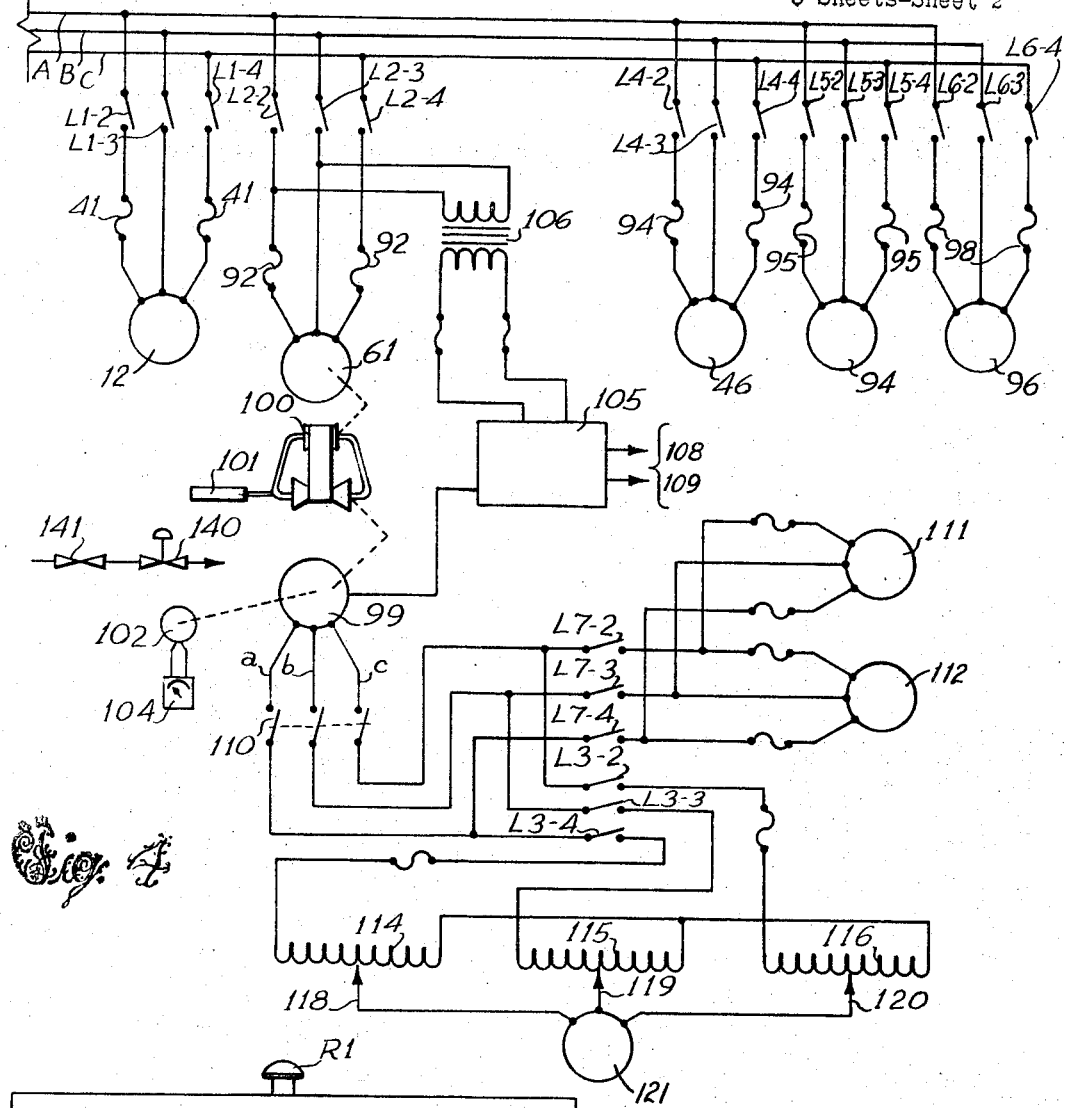
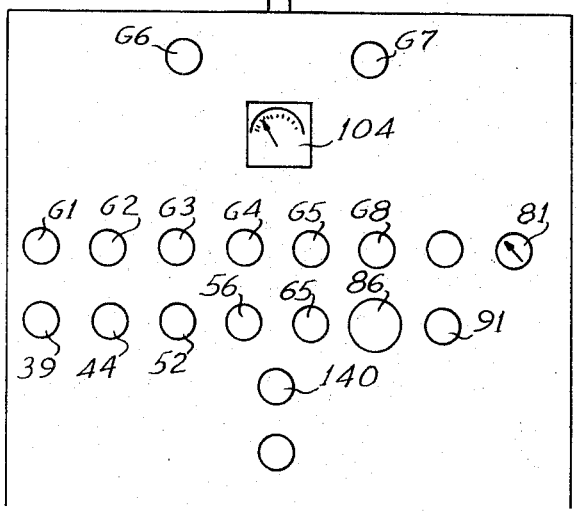

INVENTOR
MORRIS M. BRYAN Jr.

BY Newton, Hopkins, Jones & Ormsby

ATTORNEYS

United States Patent Office 3,344,480
Patented Oct. 3, 1967

3,344,480
AUTOMATIC FIBER PROCESSING APPARATUS
Morris M. Bryan, Jr., Jefferson, Ga., assignor to The Jefferson Mills, Inc., Jefferson, Ga., a corporation of Georgia
Filed Sept. 13, 1965, Ser. No. 486,767
6 Claims. (Cl. 19—65)

ABSTRACT OF THE DISCLOSURE

What is disclosed herein is an automatic fiber processing apparatus which includes a card cylinder driven by a first electrical motor, a feed roll for feeding fibers to the card cylinder driven by a second electrical motor, and a doffer for removing fibers from the card cylinder driven by a third electrical motor and in which the speed of the second electrical motor driving the feed roll is determined independently of the speed of the first electrical motor and the card cylinder by the power output of an electrical voltage generator, and the speed of the third electrical motor driving the doffer is determined independently of the speed of the first electrical motor and the card cylinder by both the power output of the electrical voltage generator and a means for varying the speed of the third electrical motor independently of the power output of the electrical voltage generator. The apparatus also includes means for varying the speed of the electrical voltage generator so as to vary its power output, a fourth motor with a speed determined by the power output of the electrical voltage generator for driving a plurality of drafting rolls to which fibers pass from the doffer, and switch means for rendering the various motors selectively operative and inoperative.

This invention relates to automatic fiber processing equipment, and is more particularly concerned with an automated system for handling fibers from the bale to the sliver.

In the past, numerous attempts have been made to cut out various steps in the processing of fibers; and, some of these have met with ameasure of success. The usual cutting out of steps has been in simply feeding the material directly from one process into another process rather than having to transport the output from one process to another location to be the input of the succeeding process. The principal problem with the feeding of fibers directly from one step to the next has been in controlling the various machinery so that the output of one piece of machinery is exactly sufficient for the input of the next piece of machinery. The fact that the output of one machine may be less or greater than the desired input to the next piece of machinery seems to be largely responsible for the intermediate step of transporting the output of one step to a different location to become the input of the next step.

In view of the above, the usual means of automating a fiber processing system has been to provide conveyor systems and the like to gather the output from one machine and automatically convey it to the next machine to become input of the next machine. This of course requires a considerable amount of extra equipment, in addition to the great number of controls that must be incorporated to run the equipment automatically.

It will thus be seen that the previous attempts to provide an automated fiber processing system have been only somewhat successful, and have been quite expensive, the expense coming from the initial outlay for equipment, space required for the equipment, and operating costs.

By contrast, the present invention provides a fiber processing system in which the output from one machine is fed directly into the next succeeding machine, and the various machines are controlled automatically as a complete system; and, there are individual controls for the individual pieces of equipment, and one overall control to control all equipment simultaneously once the individual pieces of equipment are adjusted relative to one another.

Further, the present invention provides both means for requiring that the various steps be performed in their proper order and sufficient stop-motion controls to prevent undue waste of both material and time.

These and other features and advantages of the present invention will become apparent from consideration of the following specification when taken in conjunction with the accompanying drawings in which:

FIG. 2 is front elevational view of the electrical control panel;

It will be understood by those skilled in the art that the control system of the present invention can be applied to a wide variety of similar equipment, though the particular equipment shown is substantially the apparatus disclosed in the copending application of Morris M. Bryan, Jr., titled "Method and Apparatus for Cleaning Cotton," Serial No. 449,118, filed April 19, 1965, now U.S. Patent No. 3,307,227.

Figure 1:
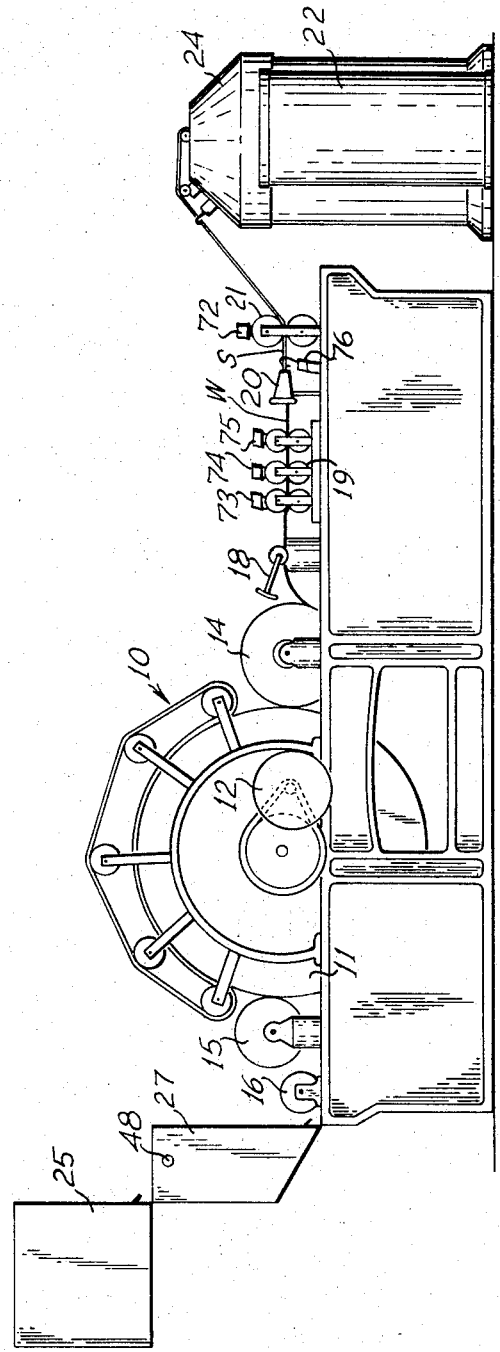
FIG. 1 is a side elevational view showing one set of apparatus to which the control of the present invention can be applied.

Referring to FIG. 1 of the drawings, it will be seen that there is a carding machine generally designated at 10, the carding machine including a main cylinder 11 having a drive motor 12, and having a conventional doffer 14, lickerin 15 and feed roll 16.

As in the above mentioned co-pending application, the web of fiber is removed from the doffer 14 by the assistance of a comb 18, then passes through a plurality of cleaning and drafting rolls 19, hereafter known as production rolls. After the web W emerges from the last pair of production rolls, the web is passed through a trumpet 20 which reduces the width of the web W sufficiently to put the web in the form of a sliver; then, the sliver S passes between a pair of calender rolls 21, and is pulled into a can 22 by a conventional coiler 24.

To feed the fibers into the carding machine 10, there are tandem hoppers including a primary hopper 25 and a secondary hopper 27. The hoppers 25 and 27 are here shown schematically; and, it will be understood that any one of a number of hopper systems can be used.

The primary hopper 25 is a bale breaker that will tear up the bale of fibers into chunks of fibers and pass the chunks to the secondary hopper 27. The secondary hopper 27 will shred the fibers further and feed them to the feed roll 16 of the carding machine 10.

Figure 3:
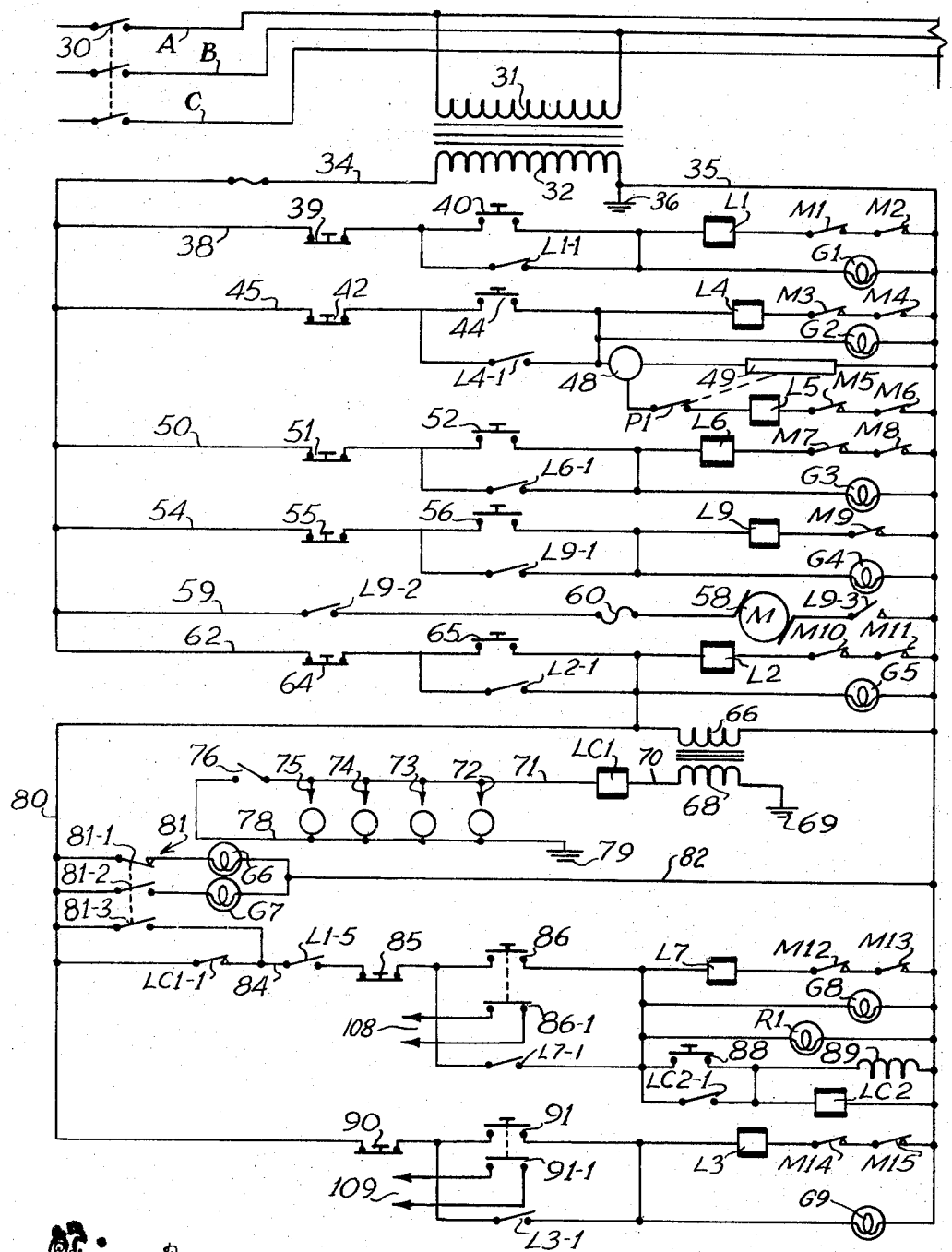
FIG. 3 is a schematic diagram of the control circuitry of the present invention; and, FIG. 4 is an extension of FIG. 3 and includes the power components.

The entire system can be understood by referring to FIGS. 3 and 4 of the drawings. In FIG. 3, it will be seen that there is a 3-phase service with phase lines A, B and C, the 3-phase wires being broken by a manual, ganged switch 30.

To energize the control circuit, there is a transformer having its primary winding 31 attached to phases A and B of the phase wires; and, the secondary winding 32 has line wires 34 and 35 attached thereto. The line wire 35 is grounded at 36 to the panel.

Between the wires 34 and 35, there is a wire 38 which includes, in series, a normally closed push button 39, a normally open push button 40, a relay L1, and two normally closed switches M1 and M2. In parallel with the push button 40, there is a relay contact L1–1 which acts as a holding means for the relay L1. There is an indicator light G1 having one side connected to the wire 35 and the other side connected to a point between the push button 40 and the relay L1.

With this arrangement it will be seen that, when the push button 40 is closed, the relay L1 will be energized to close the relay contact L1–1; and, energization of the relay L1 will be maintained through the contact L1–1 until the push button 39 is depressed to break the circuit. As long as the circuit is established, the indicator light G1 will be lighted since it is in parallel with the relay L1.

Referring to FIG. 4, there can be seen relay points L1–2, L1–3 and L1–4 which will also be closed when the relay L1 is energized. The relay points L1–2 through L1–4 are in the line wires to the card motor 12 so that, when the relay L1 is energized, the card cylinder motor 12 will also be energized. There are fuses 41 in two of the lines as is conventional on such equipment.

In parallel with the circuit of wire 38, there is another circuit in a wire 45 which includes a normally closed push button 42, a normally opened push button 44, a relay L4, and two normally closed switches, M3 and M4. The arrangement is exactly like the arrangement in the wire 38 and includes relay contact L4–1 in parallel with the push button 44 as a holding circuit for the relay L4; and, there is an indicator light G2 connected from the wire 35 to a point between the push button 44 and the relay L4.

This circuit, in the wire 45, energizes the secondary hopper 27. This can be seen in FIG. 4 which shows relay contacts L4–2, L4–3 and L4–4, these relay contacts being in the line wires leading to the motor 46 which drives the secondary hopper in a conventional manner (not shown).

Also connected to the wire 45, there is a photoelectric cell 48 and a conventional control circuit 49 for photoelectric cell 48. It will be understood by those skilled in the art that, when the photoelectric cell 48 is energized, the control circuit 49 will cause a switch to be closed, that switch being shown at P1. In series with the switch P1, there is a relay L5, the opposite side of which is connected to the wire 35 through two normally closed switches M5 and M6.

There is a wire 50 extending between the wires 34 and 35 and containing circuit components arranged exactly as those in the wire 38. This includes a normally closed push-button 51 a normally open push button 52, a relay L6 and two normally closed switches M7 and M8; and, there is a relay contact L6–1 in parallel with the push button 52, and an indicator light G3 in parallel with the relay L6. This circuit is the control for the secondary hopper fan which is energized through relay contacts L6–2, L6–3 and L6–4 as is seen in FIG. 4 of the drawings.

Below the wire 50 there is a wire 54 that includes a normally closed push button 55, a normally open push button 56, a relay L9 and a normally closed switch M9; and, there is a relay contact L9–1 in parallel with the push button 56 and an indicator light G4 in parallel with the relay L9. This is a control circuit for a conventional auto doffer (not shown) for doffing and replacing a can 22 after it has been filled by the coiler 24, the motor for which is designated at 58 in FIG. 3 of the drawings. It will be seen that the motor 58 is connected in a wire 59 that is between the wires 34 and 35, and the wire 59 includes a normally open contact L9–2 and a relay contact L9–3, the two relay contacts L9–2 and L9–3 being on opposite sides of the motor 58. There is also a fuse 60 in the wire 59 for overload protection.

At this point, it should be understood that several of the components in the apparatus of the present invention are energized from an alternating current generator, the generator being driven by a conventional three phase electric motor. This arrangement is shown in FIG. 4 of the drawings and will be discussed in more detail hereafter.

The motor to drive the alternating current generator is designated at 61, and is energized through relay contacts L2–2, L2–3 and L2–4, these contacts being closed by relay L2 which is shown, in FIG. 3, attached in the wire 62. The circuit components in wire 62 are the same as those in wire 38, and include a normally closed push button 64, a normally open push button 65, relay L2 and two normally closed switches M10 and M11; also, there is a relay contact L2–1 in parallel with the relay L2.

Also in parallel with the relay L2, there is a primary winding 66 of a transformer, the secondary winding 68 of which has one side grounded at 69 and the other side connected to a wire 70. The wire 70 is connected to a relay LC1; and, the opposite side of relay LC1 is connected to a wire 71. The wire 71 is connected to a plurality of switches 72, 73, 74, 75 and 76. Each of the switches 72 through 76 is arranged to indicate some trouble with the fiber processing apparatus such as excessive fibers in the carding machine 10 or the lack of fibers between a pair of the cleaning and drafting rolls 19.

It will be seen that there is a wire 78 which is grounded at 79, the wire 78 being connected to the opposite side of each of the switches 72 through 76. It will thus be seen that, when a particular problem arises in the processing apparatus, one of the switches 72 through 76 will be closed to establish a complete circuit between the ground 79, through the relay LC1 and to the secondary winding 68 of the transformer. The effect of energizing relay LC1 will be discussed later.

There is a triple pole, single throw switch 81 having one contact of each pole connected to a wire 80. The wire 80 is connected to the wire 34 through both push button 65 and a relay contact L2–1 so that, when either of these switches is closed, the wire 80 is at the same potential as the wire 34. On the switch, there is a normally closed contact 81–1 which leads through a lamp G6 to the wire 35 through a wire 82; there is a normally open contact 81–2 which leads through a lamp G7 and is connected to the wire 82; and there is a normally open contact 81–3 which is connected to a wire 84. The switch 81 is the motion control switch to activate or to deactivate various stop-motions of switches 72 through 76; and, the contact 81–1 energizes the lamp G6 to indicate that the motion control is activated and the contact 81–2 energizes the lamp G7 to indicate that the motion control is deactivated. The contact 81–3 is the actual deactivating contact. It will be seen that the contact 81–3 is in parallel with the relay contact LC1–1 which is a normally closed contact. It will therefore be seen that, when one of the switches 72 through 76 is closed, the relay LC1 will be energized to open the contact LC1–1 which will, as will be seen later, stop the feed roll and the calender roll and production rolls. If, however, the switch contact 81–3 is closed, even though the relay contact LC1-1 is opened, the feed roll, calender roll and production rolls will remain energized through the contact 81–3.

The wire 84 is connected to the wire 80, and contains the relay contact LC1–1, a normally open contact L1–5, a normally closed push button 85, a normally open push button 86, a relay L7, and two normally closed switches M12 and M13. It will be seen that the push button 86 is a double pole button, both poles being normally open. The pole 86–1 leads to the forcing control which will be discussed later.

In parallel with the push button 86, there is a relay contact L7–1 which acts as a holding point for the relay L7; and, in parallel with the relay L7, there is an indicator lamp G8. In parallel with the lamp G8, there is a lamp R1, and in parallel with the lamp R1, there is a series circuit containing a push button 88 and a solenoid 89. There is a relay contact LC2–1 which acts as the holding point for the relay LC2, the relay LC2 being connected between the wire 35 and the push button 88.

Also connected between the wire 80 and the wire 35, there is a circuit similar to that of the wire 38 and including a normally closed push button 90, a normally open push button 91, a relay L3, and two normally closed switches M14 and M15. There is a relay contact L3–1 in parallel with the push button 91, and an indicator lamp G9 in parallel with the relay L3. It will be seen that there is a second pole 91–1 on the push button 91, the contacts of which are connected to the forcing control which will be described later.

Attention is now directed to FIG. 4 of the drawings which shows the power arrangement for the apparatus of the present invention.

The phase wires A, B and C have connected thereto the leads from the motor 12, the leads passing through the fuses 41 and the relay contacts L1–2 through L1–4. The same is true of the motor 61, the leads including fuses 92 and relay contacts L2–2 through L2–4. The motor 46 has fuses 94 and relay contacts L4–2 through L4–4, the motor 94 has fuses 95 and relay contacts L5–2 through L5–4, and the motor 96 has fuses 98 and relay contacts L6–2 through L6–4 in the same arrangement.

The motor 61 is the motor that drives the alternator 99, the drive being through a variable speed mechanism such as a "Reeves" drive. Though a "Reeves" drive is here illustrated, it will be understood that any of a variety of variable speed mechanisms can be used.

To shift the relative position of the pulleys on the "Reeves" drive 100, there is an air cylinder 101, the air cylinder 101 being under the control of a valve operated by the solenoid 89. The alternator 99 is furnished with a tachometer generator 102 to which is connected a meter 104. The meter 104 can be calibrated in r.p.m. so that the speed of the alternator can be monitored at all times.

It will be understood by those skilled in the art that, when the load on the alternator is increased, the alternator will tend to slow down; however, in equipment such as that with which we are here concerned, it is very undesirable to have the alternator slow down since the voltage will decrease proportionately. To prevent the temporary slow-down, there is a forcing control used. The forcing control indicated at 105 is energized from a transformer 106, the primary winding of which is connected to the lines leading to the motor 61, and is connected effectively to the phases A and B.

The forcing control is a conventional piece of apparatus, so no exhaustive description will be included here. Suffice it to say that the forcing control is energized through the lines 108 or 109 on the push button contacts 86–1 and 91–1 respectively. When the forcing control is activated, the alternator is over excited so that the speed is maintained at the correct r.p.m.

The output of the alternator 99 is on the 3-wires *a*, *b* and *c* through the 3-pole ganged switch 110 and to the various motors. The lines *a*, *b* and *c* go through relay contacts L7–2, L7–3, and L7–4 to motors 111 and 112, these motors being the drive for the feed rolls, and for the calender rolls and production rolls.

The phase wires *a*, *b* and *c* also go through relay contacts L3–2, L3–3 and L3–4 to three coils connected in a conventional electrical Y configuration, the coils being designated 114, 115 and 116.

The illustration depicts coils; however, it should be understood that the actual item is known as a "Powerstat" which is simply a winding having every coil thereof tapped, and a sliding contact 118, 119 and 120 on the coils 114, 115 and 116 respectively. It will thus be seen that the effect is a variable resistance so that the voltage to the doffer motor 121 can be varied to change the speed of the doffer.

Operation

With the above description in mind, the operation of the apparatus should be understood from the following.

With a bale of cotton or other fibers in position, the push button 40 is depressed to energize relay L1, thus closing the relay contacts L1–2, L1–3 and L1–4 to energize the card cylinder motor 12. The card cylinder should be started first because there is a considerable time lapse before the card cylinder reaches its desired speed; and, no fiber should be fed to the card cylinder until the cylinder has reached its final speed. When the push button 40 is depressed, the relay contact L1–1 will also be closed to maintain energization of the relay L1; and, the indicator light G1 will be lighted to show that the main cylinder is energized.

Next, the push button 44 is depressed to energize the relay L4, thus closing the relay contacts L4–2, L4–3 and L4–4 to energize the drive motor 46 of the secondary hopper 27. The indicator light G2 will also be lighted to show that the secondary hopper is energized since there will of course be no fiber in the secondary hopper, the photoelectric cell 48 will have the light beam shining thereon so that the switch P1 will be closed, thus energizing relay L5. When relay L5 is energized, the relay contacts L5–2, L5–3 and L5–4 will be closed to energize the primary hopper 25.

It will thus be seen that, as long as there is sufficiently little fiber in the secondary hopper 27 to uncover the photoelectric cell 48, the primary hopper 25 will operate to place fiber into the secondary hopper 27; then, when there is sufficient fiber in the secondary hopper 27, the photoelectric cell 48 will be covered, causing the switch P1 to open and terminate operation of the primary hopper 25.

Next, the push button 52 is pressed to energize the relay L6 and the indicator lamp G3. The relay contact L6–1 will be closed to hold the relay L6; and the relay contacts L6–2, L6–3 and L6–4 will also be closed to energize the motor 96 to run the secondary hopper fan (not shown) which is used in conventional manner to provide the air flow for forming the lap of fibers (not shown) that is delivered to the carding machine 10 from the secondary hopper 27. The indicator lamp G3 will show that the secondary hopper fan is running.

The next step is to push the push button 56 to energize relay L9, thereby closing relay contact L9–1 which will hold the relay L9; and, the lamp G4 will be lighted to indicate that the relay L9 is energized. The relay L9 will also close relay contacts L9–2 and L9–3 to energize the motor 58. This motor is to drive the auto doffer of known type (not shown).

The next step is to depress the push button 65 to energize relay L2, the relay being held through contact L2–1. The energizing of relay L2 will close the relay contacts L2–2, L2–3 and L2–4 to energize the motor 61, the motor 61 being the drive for the alternating current generator 99. When the relay L2 is energized, the lamp G5 will be lighted to indicate that the motor 61 is running, and the primary winding 66 of the transformer will be energized to increase the voltage into the secondary winding 68, thereby energizing the various stop motion switches 72 through 76.

Thus far, it will be seen that the carding machine is running and the two hoppers 25 and 27 are running so that the machine is prepared to receive fibers for processing. Also, the alternating current generator is running so that a voltage is available on its wire *a*, *b* and *c*. With these conditions, the apparatus is ready to process fibers.

The next step would be to close the switch 110 to make electrical power available for the motors 111, 112 and 121.

For the next steps, the motion control switch 81 should be in its off position, which is the transferred position from that shown in the drawings. This allows the various components to run even though the switches 72 through 76 will not be in the proper conditions to allow the apparatus to run since there is no fiber at the various stations.

Now, the push button 86 would be depressed so that, since the relay L1 is energized and the relay contact L1-5 is closed, the relay L7 will be energized to close the contacts L7-2, L7-3 and L7-4 thereby energizing the motors 111 and 112 which are the drive means for the calender rolls and production rolls and the feed roll respectively. When the push button 86 is depressed, the contact 86-1 will be closed to energize the forcing control 105 to over excite the alternating current generator 99 and maintain the desired speed of the generator so that sufficiently high voltage will be provided for the motors 111 and 112.

When the relay L7 is energized, the indicator lamp G8 will be lighted and the lamp R1 will be lighted. The lamp G8 shows that the calender roll and production rolls and the feed roll are operating, and the lamp R1 seen also in FIG. 2 of the drawings, is a warning light to indicate that one of the switches 71 through 76 has closed, therefore, there is some problem in the processing. Of course, when the relay L7 was energized, the contact L7-1 will close and act as a holding means for the relay L7.

Next, the push button 91 is depressed to energize the relay L3, closing the contact L3-1 to hold the relay L3 and closing the contacts L3-2, L3-3 and L3-4 to energize the coils 114, 115 and 116 through which the doffer drive motor 121 is energized. It will be realized that, simultaneously with the closing of push button 91, the contact 91-1 will be closed to energize the forcing control 105 and over excite the generator 99 for a short period of time to prevent the slowing down of the motors 111 and 112 while the motor 121 comes up to speed. Also, with the energizing of relay L3, the indicator lamp G9 will be lighted to indicate that the motor 121 is running.

After the entire process has been started, and the fiber has been fed through the apparatus so that all of the stop motion switches can be used in their proper function, the motion control switch 81 is transferred to the position shown in the drawings in which the contact 81-3 is opened so that the contact LC1-1 controls the circuit of the wire 84. With this condition, when any one of the switches 72 through 76 is closed, the relay LC-1 will be energized to open the contact LC1-1 and break the circuit to the relay L7 which will de-energize the calender roll, production rolls and the feed rolls.

To change the rate of production, there is an air operated manual control 140 coupled to a pressure operated switch 141. Depending on the pressure allowed by the control 140, the switch 141 will operate the solenoid 89 to shift a valve and cause movement of the air cylinder 101 to shift the position of the "Reeves" drive 100 to vary the speed of the generator 99 with respect to the motor 61. It will be understood that, when the speed of the generator 99 is changed, the frequency will change to cause a change in speed of the motors 111, 112 and 121.

For automatic acceleration of the entire process to the speed set by the production control 140, the push button 88 is provided which will energize the relay LC2, the relay LC2 closing the contact LC-1 to energize the coil 89 and cause a shifting of the "Reeves" drive 100 by the air cylinder 101, changing the speed of the generator 99 with respect to the drive motor 61.

It will thus be seen that the apparatus and control of the present invention provide well interconnected means for automatically running a fiber processing system. The various components of the system can be varied relative to the other components independently of the other components, and the entire system can be varied while maintaining the relative speeds of the individual components.

It will of course be understood that the particular embodiment of the invention here chosen is by way of illustration only, and is meant to be in no way restrictive; therefore, numerous changes and modifications may be made and the full use of equivalents resorted to, without departing from the spirit or scope of the invention and defined by the appended claims.

What is claimed as invention is:

1. In a fiber processing apparatus having a card cylinder driven by a first motor, means for feeding fibers to said card cylinder including a rotatable feed roll positioned to feed fibers toward said card cylinder, and means for removing fibers from said card cylinder including a rotatable doffer positioned to remove fibers from said card cylinder, an electrical voltage generator operative to provide a variable power output in response to changes in its speed, means for varying the speed of said electrical voltage generator, a second motor operable by said power output at a speed determined by said power output and drivingly connected to said feed roll so as to rotate said feed roll, a third motor operable by said power output at a speed determined by said power output and drivingly connected to said doffer so as to rotate said doffer, and means for varying the speed of said third motor independently of said power output.

2. The fiber processing apparatus of claim 1 in which said fibers pass as a web of fibers from said doffer to a means for forming a sliver from said web of fibers and including a plurality of rotatable drafting rolls positioned to draft said web of fibers between said doffer and said means for forming a sliver, and a fourth motor operable by said power output at a speed determined by said power output and drivingly connected to said plurality of rotatable drafting rolls so as to rotate said plurality of rotatable drafting rolls.

3. The fiber processing apparatus of claim 2 including feeder means for feeding fibers to said feed roll, said feeder means being operative independently of said power output of said electrical voltage generator.

4. The fiber processing apparatus of claim 3 in which said feeder means includes a secondary hopper operative to feed fibers to said feed roll, and a primary hopper operative to feed fibers to said secondary hopper, and means for independently operating said primary hopper and said secondary hopper.

5. The fiber processing apparatus of claim 2 in which said fourth motor is operable simultaneously with said second motor.

6. The fiber processing apparatus of claim 1 in which said means for varying the speed of said electrical voltage generator is a fifth motor drivingly connected to said electrical voltage generator by a variable speed mechanism.

References Cited

UNITED STATES PATENTS

| | | |
|---|---|---|
| 2,270,720 | 1/1942 | Thompson. |
| 2,813,309 | 11/1957 | West et al. _____ 19—.26 |
| 3,003,195 | 10/1961 | Varga _____ 19—106 X |
| 3,184,798 | 5/1965 | Burnet et al. _____ 19—65 |
| 3,216,063 | 11/1965 | Gossett et al. _____ 19—.25 |
| 3,251,093 | 5/1966 | Maynard et al. _____ 19—.25 X |
| 3,268,953 | 8/1966 | Burnham _____ 19—106 X |

DORSEY NEWTON, *Primary Examiner.*